United States Patent
Singh (10) Patent No.: US 9,798,486 B1
(45) Date of Patent: Oct. 24, 2017

(54) METHOD AND SYSTEM FOR FILE SYSTEM BASED REPLICATION OF A DEDUPLICATED STORAGE SYSTEM

(71) Applicant: EMC Corporation, Hopkinton, MA (US)

(72) Inventor: Pranay Singh, Cupertino, CA (US)

(73) Assignee: EMC IP Holding Company LLC, Hopkinton, MA (US)

(*) Notice: Subject to any disclaimer, the term of this patent is extended or adjusted under 35 U.S.C. 154(b) by 162 days.

(21) Appl. No.: 14/132,921

(22) Filed: Dec. 18, 2013

(51) Int. Cl.
*G06F 3/06* (2006.01)
*G06F 11/14* (2006.01)

(52) U.S. Cl.
CPC ............ *G06F 3/0641* (2013.01); *G06F 3/067* (2013.01); *G06F 3/0619* (2013.01); *G06F 3/0644* (2013.01); *G06F 11/1453* (2013.01)

(58) Field of Classification Search
CPC ........... G06F 3/0641; G06F 11/1446–11/1469; G06F 17/3015–17/30162; G06F 3/0644; G06F 3/0664; G06F 3/0665
See application file for complete search history.

(56) References Cited

U.S. PATENT DOCUMENTS

| | | | |
|---|---|---|---|
| 8,037,345 B1 * | 10/2011 | Iyer et al. | 714/6.12 |
| 8,751,454 B1 * | 6/2014 | Bushman et al. | 707/640 |
| 8,825,972 B1 * | 9/2014 | Tsaur | 711/162 |
| 9,081,792 B1 * | 7/2015 | Williams et al. | |
| 2007/0067256 A1 * | 3/2007 | Zayas | G06F 17/30067 |
| 2008/0098217 A1 * | 4/2008 | Pletka | G06F 21/6218 713/165 |
| 2008/0282047 A1 * | 11/2008 | Arakawa et al. | 711/162 |
| 2010/0077168 A1 * | 3/2010 | Arakawa | G06F 12/0223 711/165 |
| 2010/0114833 A1 * | 5/2010 | Mu | G06F 11/1453 707/650 |
| 2011/0218969 A1 * | 9/2011 | Anglin et al. | 707/679 |
| 2013/0086009 A1 * | 4/2013 | Li et al. | 707/692 |
| 2013/0275696 A1 * | 10/2013 | Hayasaka | G06F 3/0608 711/162 |

(Continued)

OTHER PUBLICATIONS

Zhu et al. "Avoiding the Disk Bottleneck in the Data Domain Deduplication File System." Feb. 2008. USENIX. FAST '08. pp. 269-282.*

*Primary Examiner* — Nathan Sadler
(74) *Attorney, Agent, or Firm* — Blakely, Sokoloff, Taylor & Zafman LLP (57) ABSTRACT

A computer-implemented method of replicating a file system is disclosed. The method starts with receiving a source file system container map at a target storage system, the source file system container map including mapping between a source file system and containers containing data of the source file system. An active target file system container map is then created based on the source file system container map to map data of the source file system to containers of the target storage system storing the data of the source file system. The data corresponding to the containers mapping to the source file system are received. The active target file system container map is then populated as containers of the target storage system are populated with data from the deduplicated source storage system, wherein the source and target container maps are utilized in subsequent restoration of data of the source file system.

17 Claims, 8 Drawing Sheets

(56) References Cited

U.S. PATENT DOCUMENTS

2014/0074794 A1* 3/2014 Chavda ............... G06F 11/1453
707/679
2014/0188805 A1* 7/2014 Vijayan ........................ 707/646

* cited by examiner

METHOD AND SYSTEM FOR FILE SYSTEM BASED REPLICATION OF A DEDUPLICATED STORAGE SYSTEM

FIELD OF THE INVENTION

Embodiments of the present invention relate generally to deduplicated storage systems. More particularly, embodiments of the invention relate to implement file system based replication of a deduplicated storage system.

BACKGROUND

Data storage is a critical component for computing. In a computing device, there is a storage area in the system to store data for access by the operating system and applications. In a distributed environment, additional data storage may be a separate device that the computing device has access to for regular operations. In an enterprise environment, the stored data in the storage area of the computing device or additional data storage often access one or more offsite storage devices as a part of a global disaster recover (DR) strategy to protect the entire organization by having one or more copies of data at offsite locations. Traditionally, backup applications are used to copy data to tapes, which are then physically shipped to offsite locations. This labor-intensive process is error prone, introduces security risks and is extremely slow for data recovery. A network-based alternative is to transfer stored data over a computer network. In this kind of environment, an onsite storage may be referred to as a source storage, and an offsite storage may be referred to as a target storage. For data protection purposes, it is important to make regular copies of data from a source storage to a target storage, and the process may be referred to as data replication.

Data deduplication is a set of techniques for eliminating duplicated copies of repeating data. It improves storage utilization and can also be applied to copy data across network to reduce the amount of data to be transferred. Thus data deduplication can be utilized along with data replication. Yet, it is challenging to effectively replicate data from a deduplicated storage system.

BRIEF DESCRIPTION OF THE DRAWINGS

Embodiments of the invention are illustrated by way of example and not limitation in the figures of the accompanying drawings in which like references indicate similar elements.

DETAILED DESCRIPTION

Various embodiments and aspects of the inventions will be described with reference to details discussed below, and the accompanying drawings will illustrate the various embodiments. The following description and drawings are illustrative of the invention and are not to be construed as limiting the invention. Numerous specific details are described to provide a thorough understanding of various embodiments of the present invention. However, in certain instances, well-known or conventional details are not described in order to provide a concise discussion of embodiments of the present inventions.

Reference in the specification to "one embodiment" or "an embodiment" means that a particular feature, structure, or characteristic described in conjunction with the embodiment can be included in at least one embodiment of the invention. The appearances of the phrase "in one embodiment" in various places in the specification do not necessarily all refer to the same embodiment.

In the following description and claims, the terms "coupled" and "connected," along with their derivatives, may be used. It should be understood that these terms are not intended as synonyms for each other. "Coupled" is used to indicate that two or more elements, which may or may not be in direct physical or electrical contact with each other, co-operate or interact with each other. "Connected" is used to indicate the establishment of communication between two or more elements that are coupled with each other. A "set," as used herein refers to any positive whole number of items including one item.

According to some embodiments, a host is a computing device that is communicatively coupled with a source storage. The source storage may be communicatively coupled with a target storage over a network (e.g., the Internet, a storage network), where a data replication process is preformed from the source storage to the target storage. Data replication is a process of copying data (such as data blocks) from one storage system to another storage system. A data replication may be a full replication that copies a set of data blocks from a source storage to a target storage, or an incremental replication that copies only changed portion of the set of data blocks from the source storage to the target storage. When only the changed portion of the data blocks is copied, the target storage stitches together the changed portion of the set of data blocks with a previous complete copy, and a new full replica can be reconstructed.

According to some embodiments, a computer-implemented method can be utilized to replicate file system. The method starts with receiving a source file system container map at a target storage system from a deduplicated source storage system, the source file system container map including mapping between a source file system and containers containing data of the file system. An active target file system container map is then created based on the source file system container map to map data of the source file system to containers of the target storage system storing the data of the source file system. The data corresponding to the containers mapping to the source file system are received from the deduplicated source storage system at the target storage system. The active target file system container map is then populated as containers of the target storage system are populated with data from the deduplicated source storage system, wherein the source and target container maps are utilized in subsequent restoration of data of the source file system.

According to some embodiments, a target storage system for replicating file system is utilized. The target storage system contains a replication manager. The replication manager is configured to receive a source file system container map from a deduplicated source storage system, the source file system container map including mapping between a file system and containers containing data of the file system. It then creates an active target file system container map based on the source file system container map to map data of the source file system to containers of the target storage system storing the data of the source file system. The replication manager receives the data corresponding to the containers mapping to the source file system from the deduplicated source storage system to the target storage system, and it populates the active target file system container map as containers of the target storage system are populated with data from the deduplicated source storage system, wherein the source and target container maps are utilized in subsequent restoration of data of the source file system.

Figure 1:
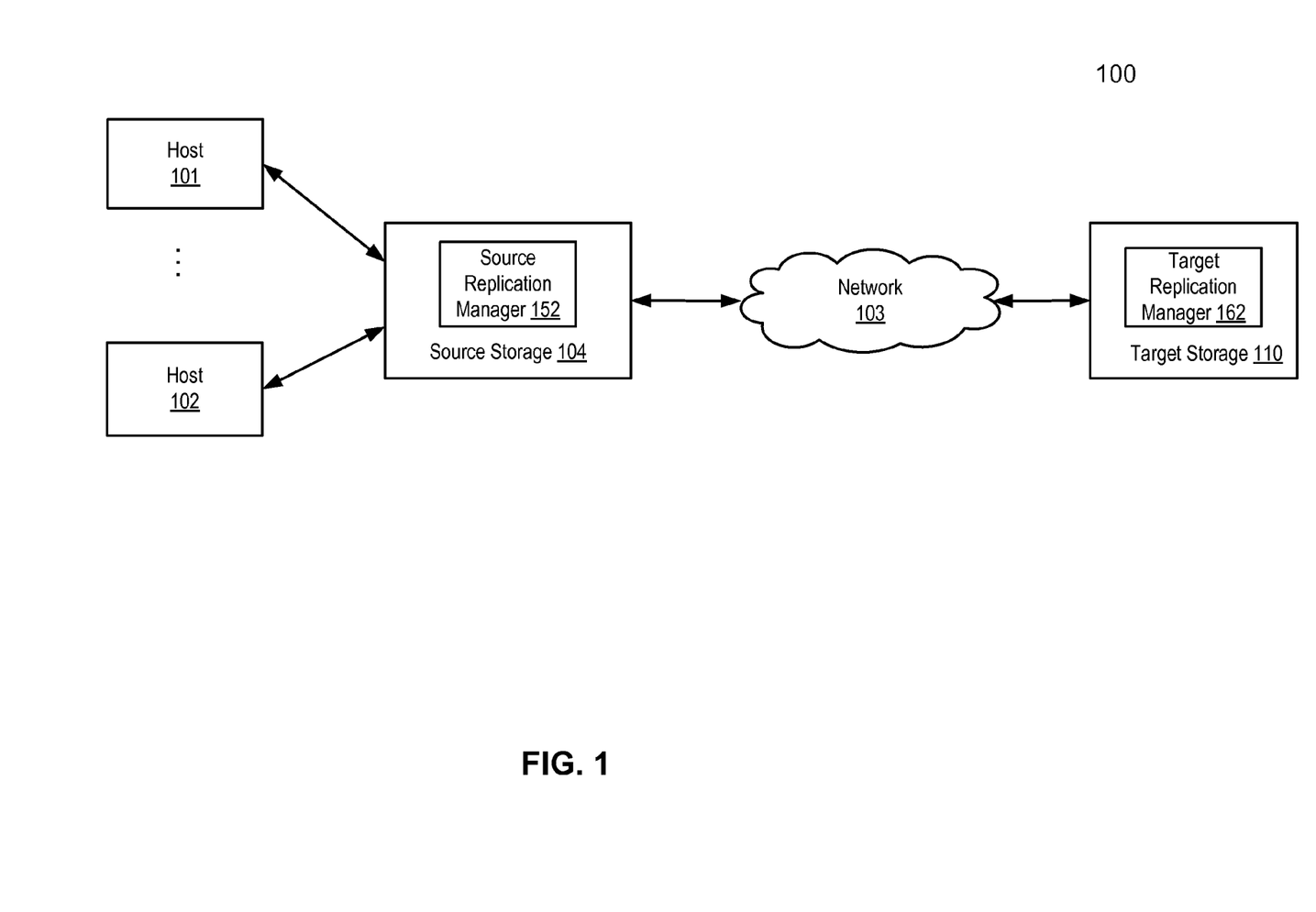
FIG. 1 is a block diagram illustrating a system for file system based replication according to one embodiment of the invention.

FIG. 1 is a block diagram illustrating a system for file system based replication according to one embodiment of the invention. Referring to FIG. 1, system 100 includes, but is not limited to, one or more hosts 101-102 communicatively coupled to source storage system 104 and target storage system 110 over network 103. Hosts 101-102 may be any type of hosts such as a server, a personal computer (e.g., desktops, laptops, and tablets), a "thin" client, a personal digital assistant (PDA), a Web enabled system, a gaming device, a media player, or a mobile phone (e.g., Smartphone), etc. Network 103 may be any type of network such as a local area network (LAN), a wide area network (WAN) such as Internet, a corporate intranet, a metropolitan area network (MAN), a storage area network (SAN), a bus, or a combination thereof, wired and/or wireless.

Source replication manager 152 and target replication manager 162 in source storage system 104 and target storage system 110 respectively manage replication processes between source storage system 104 and target storage system 110. Source replication manager 152 and target replication manager 162 may contain their respective processors for managing replication processes. They may also share processors with other modules within source storage system 104 or target storage system 110. In one embodiment, a standard alone replication management server (not shown) may be coupled to source storage system 104 and target storage system 110 and coordinate data replication between the storage systems.

Both source storage system 104 and target storage system 110 may represent any type of server or cluster of servers. For example, source storage system 104 and target storage system 110 may be a storage server used for any of various different purposes, such as to provide multiple users with access to shared data and/or to back up mission critical data. Source storage system 104 and target storage system 110 may be, for example, a file server (e.g., an appliance used to provide NAS capability), a block-based storage server (e.g., used to provide SAN capability), a unified storage device (e.g., one which combines NAS and SAN capabilities), a nearline storage device, a direct attached storage (DAS) device, a tape backup device, or essentially any other type of data storage device. Source storage system 104 and target storage system 110 may have a distributed architecture, or all of its components may be integrated into a single unit. Note source storage system 104 and target storage system 110 may have different replication performance characteristics even when they have similar architecture. Source storage system 104 is implemented as part of an archive and/or backup storage system such as a deduplicated storage system available from EMC® Corporation of Hopkinton, Mass. Target storage system 110 may also be implemented as a deduplicated storage system in some embodiments.

Figure 2:
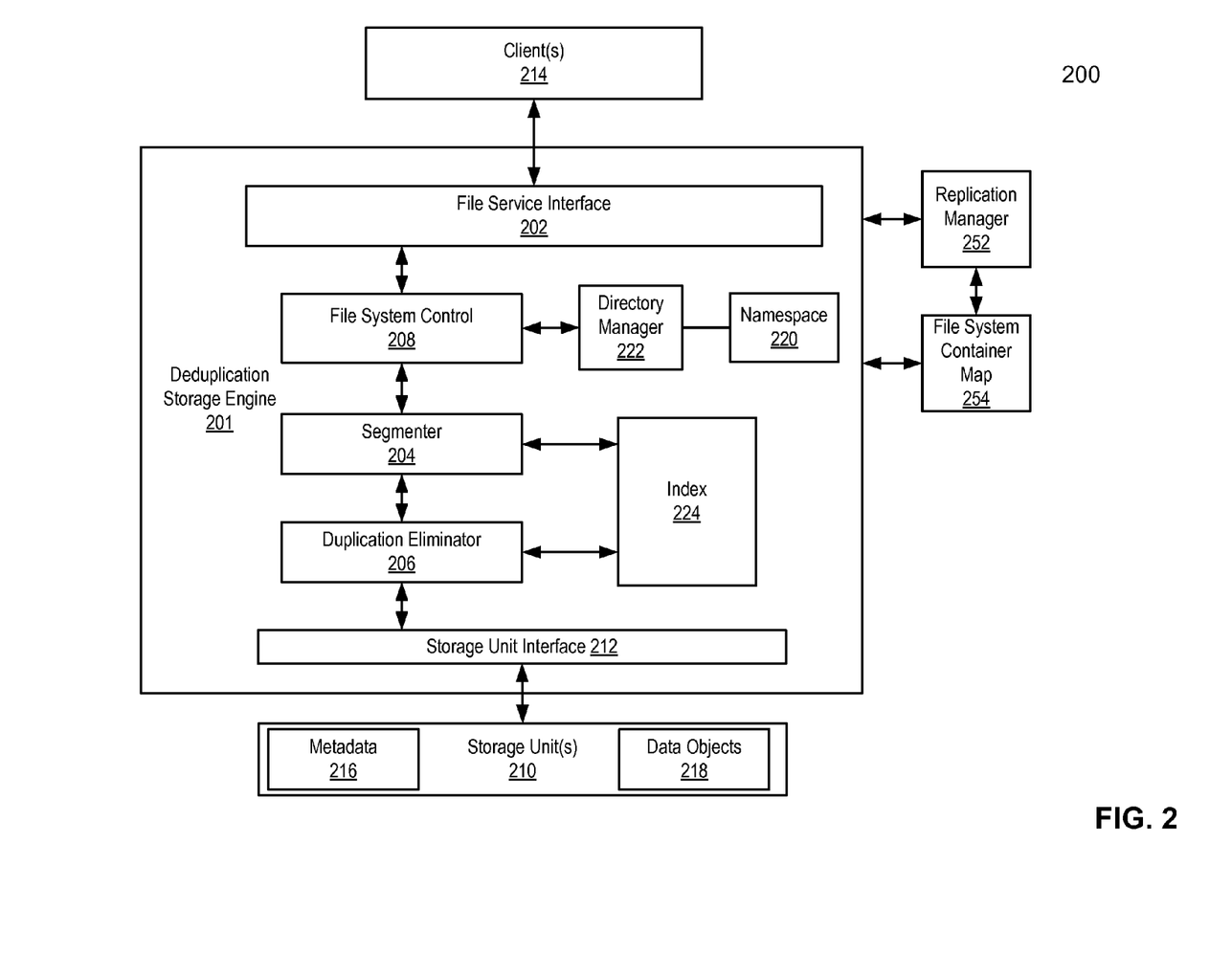
FIG. 2 is a block diagram illustrating a deduplicated source storage system according to one embodiment of the invention.

FIG. 2 is a block diagram illustrating a deduplicated source storage system according to one embodiment of the invention. The deduplicated source storage system 200 may be a detail implementation of deduplicated source storage system 104 or target storage system 110 illustrated in FIG. 1.

The deduplicated source storage system 200 interfaces one or more clients 214 with one or more storage units 210 storing metadata 216 and data objects 218. Clients 214 may be any kinds of clients, such as, for example, a client application (e.g., from hosts 101/102 of FIG. 1), backup software, or a garbage collector, located locally or remotely over a network. A network may be any type of networks such as a local area network (LAN), a wide area network (WAN) such as the Internet, a corporate intranet, a metropolitan area network (MAN), a storage area network (SAN), a bus, or a combination thereof, wired and/or wireless.

Storage units (sometimes referred to as storage devices) 210 may be implemented locally (e.g., single node operating environment) or remotely (e.g., multi-node operating environment) via an interconnect, which may be a bus and/or a network (e.g., a storage network). In one embodiment, one of storage units 210 operates as an active storage to receive and store external or fresh user data from a client (e.g., an end-user client or a primary storage system associated with one or more end-user clients), while the another one of storage units 210 operates as a target storage unit to periodically archive data from the active storage unit according to an archiving policy or scheme. Storage units 210 may be, for example, conventional magnetic disks, optical disks such as CD-ROM or DVD based storage, magnetic tape storage, magneto-optical (MO) storage media, solid state disks, flash memory based devices, or any other type of non-volatile storage devices suitable for storing large volumes of data. Storage units 210 may also be combinations of such devices. In the case of disk storage media, the storage units 210 may be organized into one or more volumes of redundant array of inexpensive disks (RAID). Data stored in the storage units may be stored in a compressed form (e.g., lossless compression: HUFFMAN coding, LEMPEL-ZIV WELCH coding; delta encoding: a reference to a chunk plus a difference; etc.). In one embodiment, different storage units may use different compression methods (e.g., main or active storage unit from other storage units, one storage unit from another storage unit, etc.).

The metadata, such as metadata 216, may be stored in at least some of storage units 210, such that files can be accessed independent of another storage unit. Metadata of each storage unit includes enough information to provide access to the files it contains. In one embodiment, metadata may include fingerprints contained within data objects 218, where a data object represents containers, which contains one or more compression regions (CRs) of one or more data chunks, CRs, or data chunks. Each data chunk is a fragment of data block and data chunks are processed and stored in the deduplicated storage system. Fingerprints are mapped to a particular data object via metadata 216, enabling the system to identify the location of the data object containing a data chunk represented by a particular fingerprint. A fingerprint may be generated based on at least a portion of a data chunk, for example, by applying a predetermined mathematical algorithm (e.g., hash function) to at least a portion of the content of the data chunk. When an active storage unit fails, metadata contained in another storage unit may be utilized to recover the active storage unit. When one storage unit is unavailable (e.g., the storage unit has failed, or is being upgraded, etc.), the system remains up to provide access to any file not stored in the failed storage unit. When a file is deleted, the metadata associated with the files in the system is updated to reflect that the file has been deleted.

In one embodiment, metadata 216 may include a file name, a storage unit identifier (ID) identifying a storage unit in which the chunks associated with the file name are stored, reconstruction information for the file using the chunks, and any other appropriate metadata information. Metadata 216 may further include a chunk ID, a chunk sketch, a hash of a chunk, an encrypted hash of a chunk, random data, or any other appropriate metadata. In some embodiments, metadata associated with a chunk is used to identify identical and/or similar data segments. The stored metadata enables a faster identification of identical and/or similar data chunks as an ID and/or sketch (e.g., a set of values characterizing the chunk) do not need to be recomputed for the evaluation of a given incoming data segment.

In one embodiment, a chunk ID includes one or more deterministic functions of a data chunk, one or more hash functions of a data chunk, random data, or any other appropriate data chunk ID. In various embodiments, a data chunk sketch includes one or more deterministic functions of a data chunk, one or more hash functions of a data chunk, one or more functions that return the same or similar value for the same or similar data chunks (e.g., a function that probably or likely returns a same value for a similar data segment), or any other appropriate data segment sketch. In various embodiments, sketch function values are determined to be similar using one or more of the following methods: numeric difference, hamming difference, locality-sensitive hashing, nearest-neighbor-search, other statistical methods, or any other appropriate methods of determining similarity. In one embodiment, sketch data includes one or more data patterns characterizing a chunk. For example, a sketch may be generated by applying one or more functions (e.g., hash functions) on a chunk and a subset of the results of the functions performed on the chunk (e.g., a number of results, for example the ten lowest results or the ten highest results) are selected as a sketch.

In one embodiment, a copy of the metadata is stored on a storage unit for files stored on a storage unit so that files that are stored on the storage unit can be accessed using only the information stored on the storage unit. In one embodiment, a main set of metadata information can be reconstructed by using information of other storage units associated with the storage system in the event that the main metadata is lost, corrupted, damaged, etc. Metadata for a storage unit can be reconstructed using metadata information stored on a main storage unit or other storage unit (e.g., replica storage unit). Metadata information further includes index information (e.g., location information for chunks in storage units, identifying specific data objects).

In one embodiment, deduplication storage engine 201 includes file service interface 202, segmenter 204, duplicate eliminator 206, file system control 208, and storage unit interface 212. Deduplication storage engine 201 receives a file or files (or data item(s)) via file service interface 202, which may be part of a file system namespace 220 of a file system associated with the deduplication storage engine 201. The file system namespace 220 refers to the way files are identified and organized in the system. An example is to organize the files hierarchically into directories or folders, which may be managed by directory manager 222. File service interface 202 supports a variety of protocols, including a network file system (NFS), a common Internet file system (CIFS), and a virtual tape library interface (VTL), etc.

The file(s) is/are processed by segmenter 204 and file system control 208. Segmenter 204, also referred to as a content store, breaks the file(s) into variable-length chunks based on a variety of rules or considerations. For example, the file(s) may be broken into chunks by identifying chunk boundaries. Chunk boundaries may be determined using file boundaries, directory boundaries, byte counts, content-based boundaries (e.g., when a hash of data in a window is equal to a value), or any other appropriate method of determining a boundary. Reconstruction of a data block, data stream, file, or directory includes using one or more references to the one or more chunks that originally made up a data block, data stream, file, or directory that was/were previously stored.

In some embodiments, chunks are segmented by identifying chunk boundaries that are content-based—for example, a hash function is applied to values of data within a sliding window through the data stream or block and when the hash function is equal to a value (or equal to one of several values) then a chunk boundary is identified. In various embodiments, chunk boundaries are identified using content based functions operating on windows within a data stream or block that have a minimum or maximum or other value or any other appropriate content based chunking algorithm. In various embodiments, chunks include fixed-length chunks, variable length chunks, overlapping chunks, non-overlapping chunks, chunks with a minimum size, chunks with a maximum size, or any other appropriate chunks. In various embodiments, chunks include files, groups of files, directories, a portion of a file, a portion of a data stream with one or more boundaries unrelated to file and/or directory boundaries, or any other appropriate chunk.

In one embodiment, file system control 208, also referred to as a file system manager, processes information to indicate the chunk(s) association with a file. In some embodiments, a list of fingerprints is used to indicate chunk(s) associated with a file. File system control 208 passes chunk association information (e.g., representative data such as a fingerprint) to index 224. Index 224 is used to locate stored chunks in storage units 210 via storage unit interface 212. Duplicate eliminator 206, also referred to as a segment store, identifies whether a newly received chunk has already been stored in storage units 210. In the event that a chunk has already been stored in storage unit(s), a reference to the previously stored chunk is stored, for example, in a chunk tree associated with the file, instead of storing the newly received chunk. A chunk tree of a file may include one or more nodes and each node represents or references one of the deduplicated chunks stored in storage units 210 that make up the file. Chunks are then packed by a container manager (which may be implemented as part of storage unit interface 212) into one or more storage containers stored in storage units 210. The deduplicated chunks may be further compressed into one or more CRs using a variation of compression algorithms, such as a Lempel-Ziv algorithm before being stored. A container may contain one or more CRs and each CR may contain one or more deduplicated chunks (also referred to deduplicated segments). A container may further contain the metadata such as fingerprints, sketches, type of the data chunks, etc. that are associated with the data chunks stored therein.

When a file is to be retrieved, file service interface 202 is configured to communicate with file system control 208 to identify appropriate chunks stored in storage units 210 via storage unit interface 212. Storage unit interface 212 may be implemented as part of a container manager. File system control 208 communicates (e.g., via segmenter 204) with index 224 to locate appropriate chunks stored in storage units via storage unit interface 212. Appropriate chunks are retrieved from the associated containers via the container manager and are used to construct the requested file. The file is provided via interface 202 in response to the request. In one embodiment, file system control 208 utilizes a tree (e.g., a chunk tree obtained from namespace 220) of content-based identifiers (e.g., fingerprints) to associate a file with data chunks and their locations in storage unit(s). In the event that a chunk associated with a given file or file changes, the content-based identifiers will change and the changes will ripple from the bottom to the top of the tree associated with the file efficiently since the appropriate content-based identifiers are easily identified using the tree structure. Note that some or all of the components as shown as part of deduplication engine 201 may be implemented in software (e.g., executable code executed in a memory by a processor), hardware (e.g., processor(s)), or a combination thereof. For example, deduplication engine 201 may be implemented in a form of executable instructions that can be stored in a non-transitory machine-readable storage medium, where the instructions can be executed in a memory by a processor.

In one embodiment, storage system 200 may be used as a tier of storage in a storage hierarchy that comprises other tiers of storage. One or more tiers of storage in this hierarchy may utilize different kinds of storage devices and/or may be optimized for different characteristics such as random update performance. Files are periodically moved among the tiers based on data management policies to achieve a cost-effective match to the current storage requirements of the files. For example, a file may initially be stored in a tier of storage that offers high performance for reads and writes. As the file ages, it may be moved into a tier of storage according to one embodiment of the invention. In various embodiments, tiers include different storage technologies (e.g., tape, hard drives, semiconductor-based memories, optical drives, etc.), different locations (e.g., local computer storage, local network storage, remote network storage, distributed storage, cloud storage, archive storage, vault storage, etc.), or any other appropriate storage for a tiered data storage system.

When the deduplicated source storage system 200 is to be replicated to a target storage system or it is to accept replicated data from a source storage system, replication manager 252 may coordinate replication at data object level, that is, containers, CRs, or chunks may be replicated to the target storage system. However, such replication has the limitation that replication cannot be done for one or more selected file systems. Different file systems with different system namespaces may be stored in the deduplicated source storage system 200, and sometimes it is desirable to replicate data (contained in containers/CRs/chunks) of one or more selected file systems. Such replication is referred to as file system based replication in this specification. Replication manager 252, coordinating with file system container map 254 and deduplication storage engine 201, may implement such file system based replication at a source storage system. At a target storage system, replication manager 252 coordinates with file system container map 254 and optionally deduplication storage engine 201 to implement such process. Note replication manager 252 may be a part of storage unit interface 212, which itself is a part of a container manager.

Figure 3A:
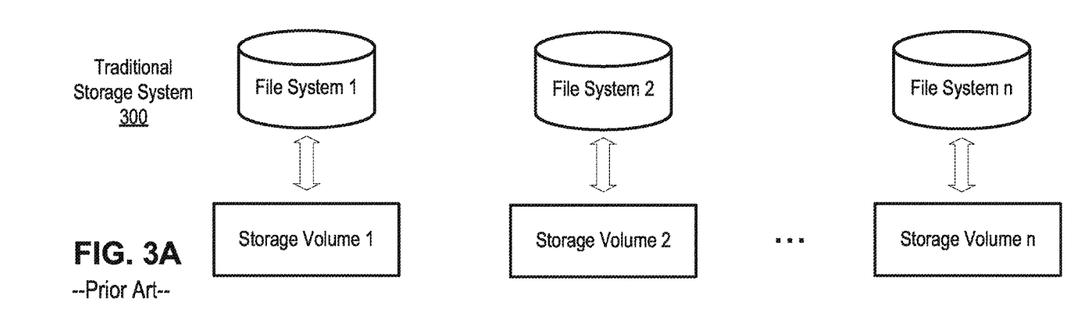
FIG. 3A is a block diagram illustrating data of file systems storing in a traditional storage system.

File system based replication for a traditional storage system 300 is known. FIG. 3A is a block diagram illustrating data of file systems storing in a traditional storage system. In a traditional storage system without deduplication, each file system corresponds to a dedicated storage volume, where data of the file system are organized hierarchically into directories and folders. Thus, each file system is identified and it is stored to a corresponding storage volume as illustrated in FIG. 3A. Each file system can then be replicated by replicating its dedicated storage volume.

Figure 3B:
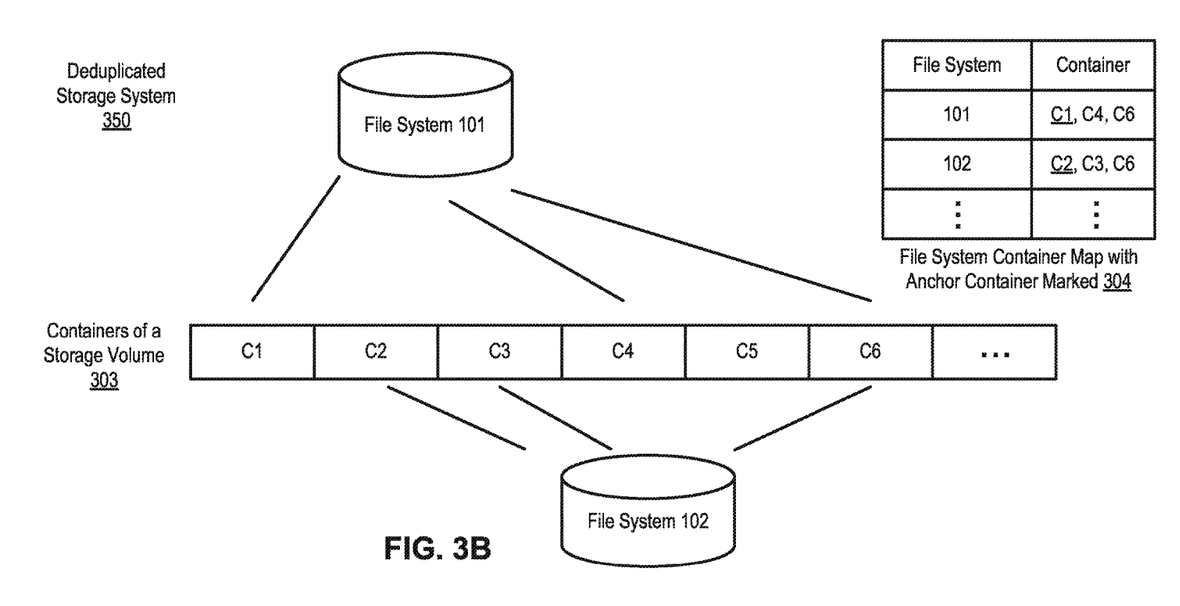
FIG. 3B illustrates a deduplicated storage system for file system based replication according to one embodiment of the invention.

In a deduplicated storage system, since a deduplication storage engine eliminates duplication of data in various file systems (through duplication eliminator 206 of FIG. 2 for example), the various file systems have a shared storage volume. FIG. 3B illustrates a deduplicated storage system for file system based replication according to one embodiment of the invention. The deduplicated storage system may contain multiple file systems, and each file system is identified with a file system identifier (ID) in the deduplicated storage system. The file system ID may be stored in file system namespace 220 of FIG. 2. The characteristics of various file systems in the deduplicated storage system may be stored at a superblock. The superblock is a segment of metadata describing the file systems of the storage system, and it may be stored in metadata 216. The superblock of the storage system indicates the file system IDs, file system locations, file system sizes, and other characteristics.

According to one embodiment, a file system container map is utilized to track file systems for replication in a deduplication storage system. Referring to FIG. 3B, the deduplicated storage system 350 contains multiple file systems, including the illustrated file systems 101 and 102. The file systems share a single storage volume, and data of the file systems are contained in containers of the storage volume at reference 303. As illustrated, data of file system 101 are stored in containers 1, 4, and 6, while data of file system 102 are stored in containers 2, 3, and 6. Note due to deduplication, some containers contain data from multiple file systems. For example, container 6 contains data from both file systems 101 and 102. File system container map 304 records the mapping between file systems and containers containing data of the file systems. File system container map 304 as illustrated is indexed on file system IDs, and each entry of the map indicates the containers for the file system of the entry. In an alternative embodiment, the file system container map may also be indexed on container ID, and each entry of the map indicates the file system(s) of which the data are stored in each entry of containers.

File system container map 304 includes indication of anchor containers according to one embodiment. An anchor container is the starting container of a file system. In other words, the anchor container contains data from where the file system should be read. For the anchor container, metadata for the anchor container indicates the chunk offset for the starting chunk of a file system. Based on the metadata for the anchor container, a storage system may read the file system from the beginning. For each file system, there is only one anchor container. A container may only be the anchor container for a single file system. As illustrated, containers 1 and 2 are the anchor containers for file systems 101 and 102, respectively. While file system container map 304 marks the anchor containers for file systems, in an alternate embodiment, the file system container map does not indicates the anchor containers, and a separate entity exists to track anchor containers for file systems (e.g., at replication manager 252 or storage unit interface 212 of FIG. 2). A file system container map may be implemented in a variety of data structures, including a table (e.g., a hash table), an array, and tuples. The file system container map may be stored separately in the memory or a persistent storage device (or non-volatile memory) of a storage system, or it may be stored as a part of storage unit interface 212.

Figure 4:
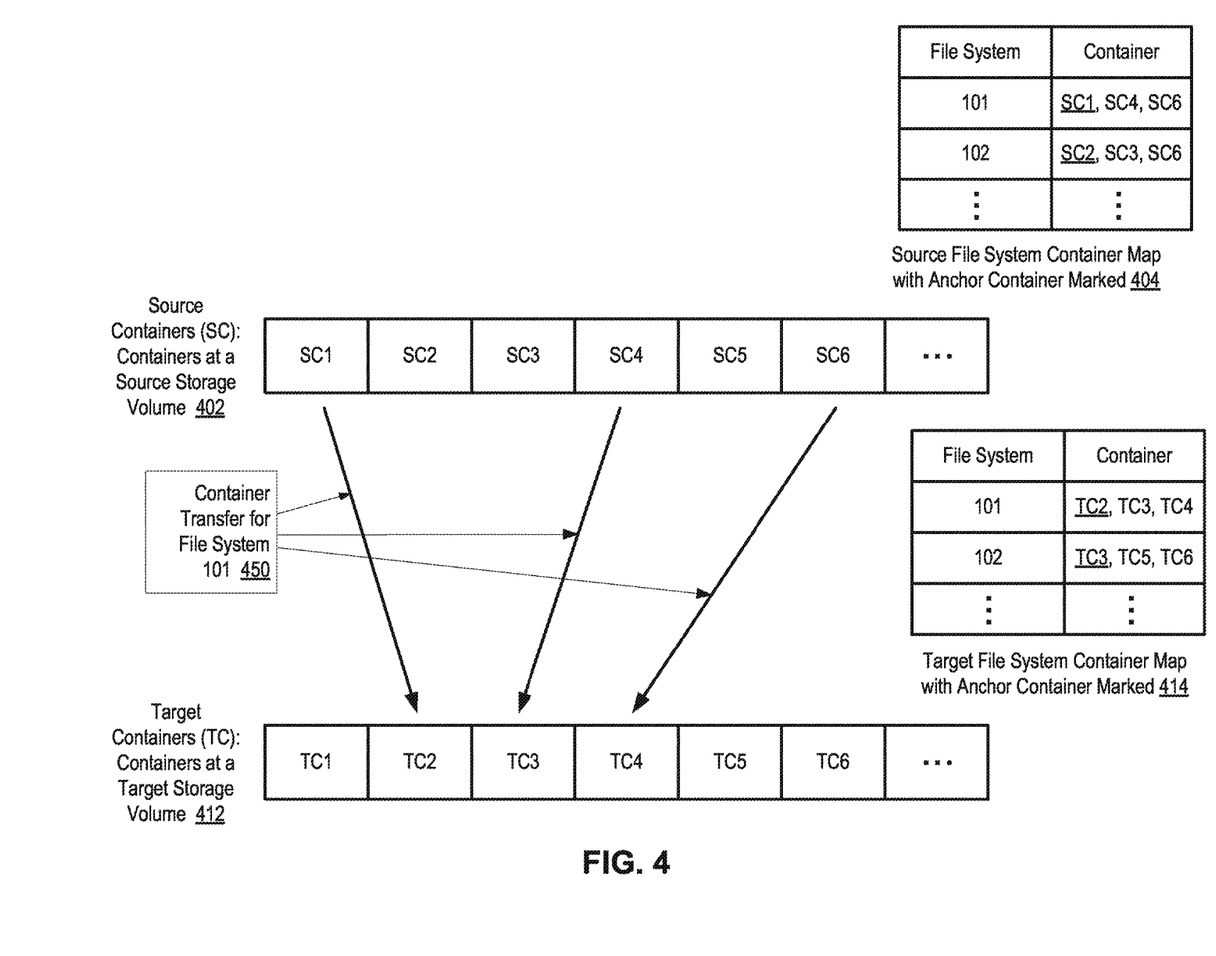
FIG. 4 illustrates a file system based replication from a deduplicated source storage to a target storage according to one embodiment of the invention.

With file system container map 304 recording data location and starting point of data of file systems, the deduplicated storage system 350 provides information for file system based replication. FIG. 4 illustrates a file system based replication from a deduplicated source storage to a target storage according to one embodiment of the invention. Referring to FIG. 4, data at the source storage are stored at source containers (SC) of the source storage volume as indicated at reference 402. At source storage, the source file system container map 404 records container locations and anchor containers. For example, data (e.g., deduplicated chunks) in file system 101 are stored in source containers (SC) 1, 4, and 6. Assuming a request is received to replicate the data of file system 101 to the target storage. The replication of data of containers from a source storage to a target storage may be referred to as container transfer 450, as it involves replicating data contained in container(s). In one embodiment, container transfer is performed by a command CONTAINER ADD, which allocates containers at the target storage and transfers data from the source storage to the allocated containers.

At the target storage, data at the target storage are stored at target container (TC) of the target storage volume as indicated at reference 412. Note the target storage volume may not contain the same data or have the same data allocation as the source storage volume. For example, the container TC1 may contain data completely different from SC1. In the example, TC1 has been occupied, and when container transfer for file system 101 occurs, the data of file system 101 is replicated to TC2, TC3, and TC4 with TC2 being the anchor container. Because containers at the target storage are allocated differently from containers at the source storage, target storage needs to maintain a different file system container map. As shown, target file system container map 414 contains different entries for file systems 101 and 102 respectively. That is, while the file system 101 has data contained in containers SC1, SC4, and SC6, after the file system 101 is replicated to the target storage, its data are stored in container TC2, TC3, and TC4. Similarly, after the file system 102 is replicated to the target storage, its data are stored in container TC3, TC5, and TC6.

Note for illustrative clarity, containers in FIG. 4 are named as source containers (SCs) and target containers (TCs) for containers in the source and target storage, respectively. Containers in a storage system may be identified by container identifiers such as numerical numbers only without designation being the source or target containers. The containers identified by the same container identifier in the source and target storages likely contain different data thus file system container maps of the source and target storages contain different entries for the same file system.

Figure 5:
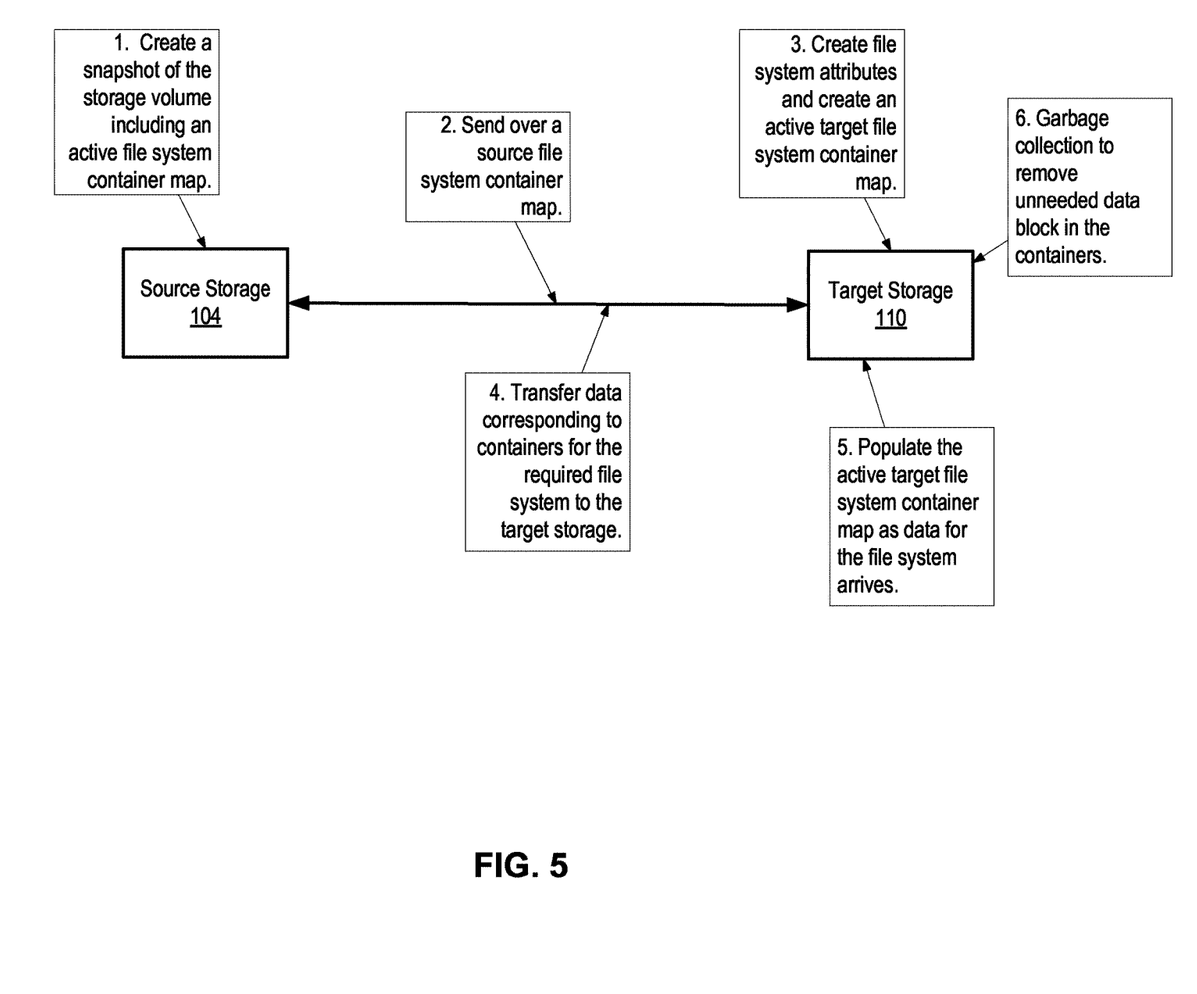
FIG. 5 illustrates an initial file system replication process from a deduplicated source storage to a target storage according to one embodiment of the invention.

FIG. 5 illustrates an initial file system replication process from a deduplicated source storage to a target storage according to one embodiment of the invention. Task boxes 1 to 5 illustrate the order in which operations are performed according to one embodiment of the invention. Source storage system 104 and target storage system 110 are the same source storage system 104 and target storage system 110 in FIG. 1 respectively. The initial file system replication process is activated when target storage system 110 has not replicated any file system from the source storage system 104 yet.

At the start of the process, a request is initiated to replicate one or more files or directories of files associated with a file system from source storage system 104 to target storage system 110. The request may be initiated by source storage system 104, target storage system 110, a management server (e.g., backup or replication server having backup/replication software such as NetWorker™ of EMC® running therein), or a third party device. In response to the request, the source storage captures a snapshot of its storage volume ("source storage volume") at task box 1. The captured snapshot of the storage volume is stored as a snapshot volume. The snapshot volume is a consistent state of the source storage volume. In response to the request, the source storage may also capture a snapshot of an active file system container map of the source storage. The capturing snapshot obtains a consistent state of the source storage to maintain data integrity for the replication.

As discussed herein above, the file system container map includes information representing or describing mapping between file systems and containers containing data of the file systems. In one embodiment, the file system container map indicates a starting point of the file systems. The source storage maintains the active source file system container during its operations, while files and data of file systems are read and written to the source storage. The snapshot of the active file system container map is a consistent state of the active file system container map.

At task box 2, source storage system 104 sends over a source file system container map to target storage system 110. In one embodiment, the source file system container map is the snapshot of the active source file system container map, which may be captured at the point in time when the replication is initiated.

At task box 3, the target storage system 110 creates a set of file system attributes and also creates an active target file system container map. File system attributes include file system name, file system protocol, file system size, and/or other characteristics to prepare the target storage system 110 for replicating the file system. The active target file system container map includes mapping between file systems and containers of the target storage system 110. The active target file system map is based on the received source file system container map as the target storage system 110 prepares for replicating the file system. However, the active target file system map may or may not be identical to the received source file system container, as the target storage system 110 container distribution may not be identical to that of the source storage system 104. The active target file system map includes mappings for existing file systems and file systems to be replicated to the target storage system 110.

At task box 4, once the file system attributes and active target file system map are created, source storage system 104 replicates data of containers to the target storage system 110, the data are from the snapshot volume of the containers storing data of the requested file system. The data are replicated to the containers of the target storage system 110 for the file system as the set of file system attributes is provisioned earlier. At task box 5, the active target file system container map is populated as containers of the target storage system 110 are packed with data from the source storage system 104. Once all the data for the file system are received and packed, the active target file system container map completes update.

As discussed herein above, the active target file system container map indicates the anchor container in one embodiment. In an alternative embodiment, a separate entity exists to track anchor containers for file systems in the target storage. After the file system is replicated to the target storage system 110, a garbage collection function of the target storage system 110 may read through the containers containing data of the file system starting from the anchor container. Through checking metadata associated with the anchor container, the garbage collection function identifies the starting chunk of the file system, and it reads from the starting chunk and discards data in the containers but not part of the file system at task box 6. After the garbage collection function is performed, the containers may be left with only data of the replicated file system.

Note after the active target file system container map is created, it may be used to replicate a different file system. Upon a request to replicate a second file system is received, the target storage may create file system attributes for that particular second file system. The target storage system 110 may request the source storage system 104 to transfer data of containers of the second file system based on the received source file system container map (using CONTAINER ADD command in one embodiment). As the data being packed into containers of the target storage, the active target file system container map is updated. Once all the data corresponding to the containers mapping to the second file system at the received source file system container map are received, the second file system is replicated at the target storage system 110. During the next garbage collection run, the data within the containers mapping to the second file system are read, and the data unrelated to the second file system are discarded.

After a file system is replicated from a source storage to a target storage, data are continuously written to the source storage, thus data location and data content for the file system at the source storage are changing over time too. For the file system based replication to work, a replication process needs to keep synchronization between data of the file system at the source storage and the target storage, for example, by maintaining up-to-date file system to container mapping information.

Figure 6:
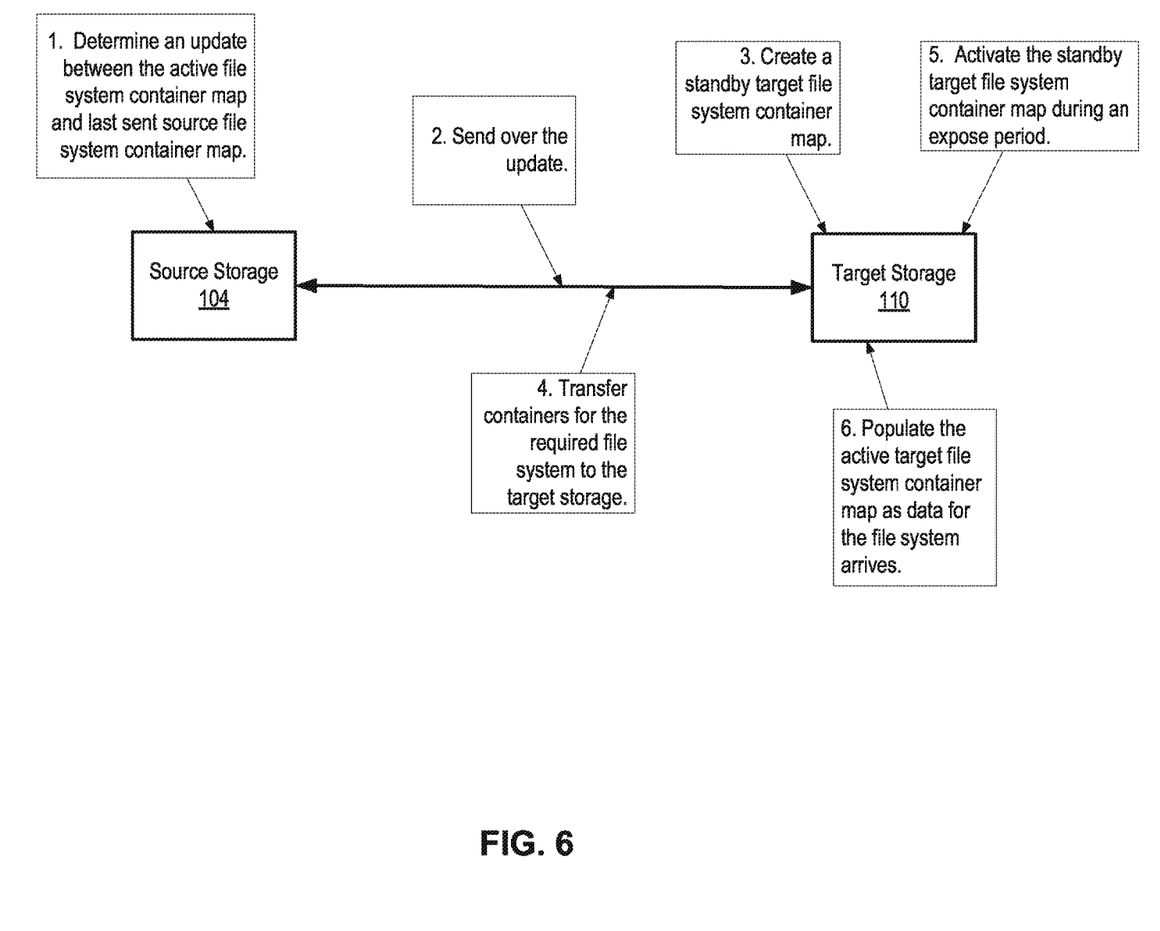
FIG. 6 illustrates a file system replication update process from a deduplicated source storage to a target storage according to one embodiment of the invention.

FIG. 6 illustrates a file system replication update process from a deduplicated source storage to a target storage according to one embodiment of the invention. Task boxes 1 to 4 and 6 illustrate the order in which operations are performed according to one embodiment of the invention. Source storage system 104 and target storage system 110 are the same source storage system 104 and target storage system 110 in FIG. 1 respectively. The file system replication update process may be initiated periodically based on a request per an update schedule, and it may be initiated spontaneously by an administrator of the source storage, target storage, or a third party.

At task box 1, after receiving a request to update replication of a file system, the source storage system 104 determines an update between the active file system container map at the moment and the last sent source file system container map. The update may be determined by capturing another snapshot of the active file system container map, and comparing it to the last sent source file system container map. The difference between the two file system container maps is sent to the target storage as an update to the last sent source file system container map at task box 2.

At task box 3, the target storage system 110 creates a standby target file system container map, which is created based on the active target file system container map and the received update. Then the target storage system 110 activates the standby target file system container map during an expose period at task box 5, which is a time period dedicated to the switching and data received from the source storage are not processed (e.g., data being buffered waiting for processing during the expose period). The activation makes the newly activated target file system container map synchronizes with the update of the source file system container map. At task box 6, the target storage system 110 populates the newly activated target file system container map as data for the file system arrives. Note the received data for the file system is an update of the data of the file system that have already been replicated in the target storage system 110. The update may include update of the anchor containers and other containers.

Figure 7:
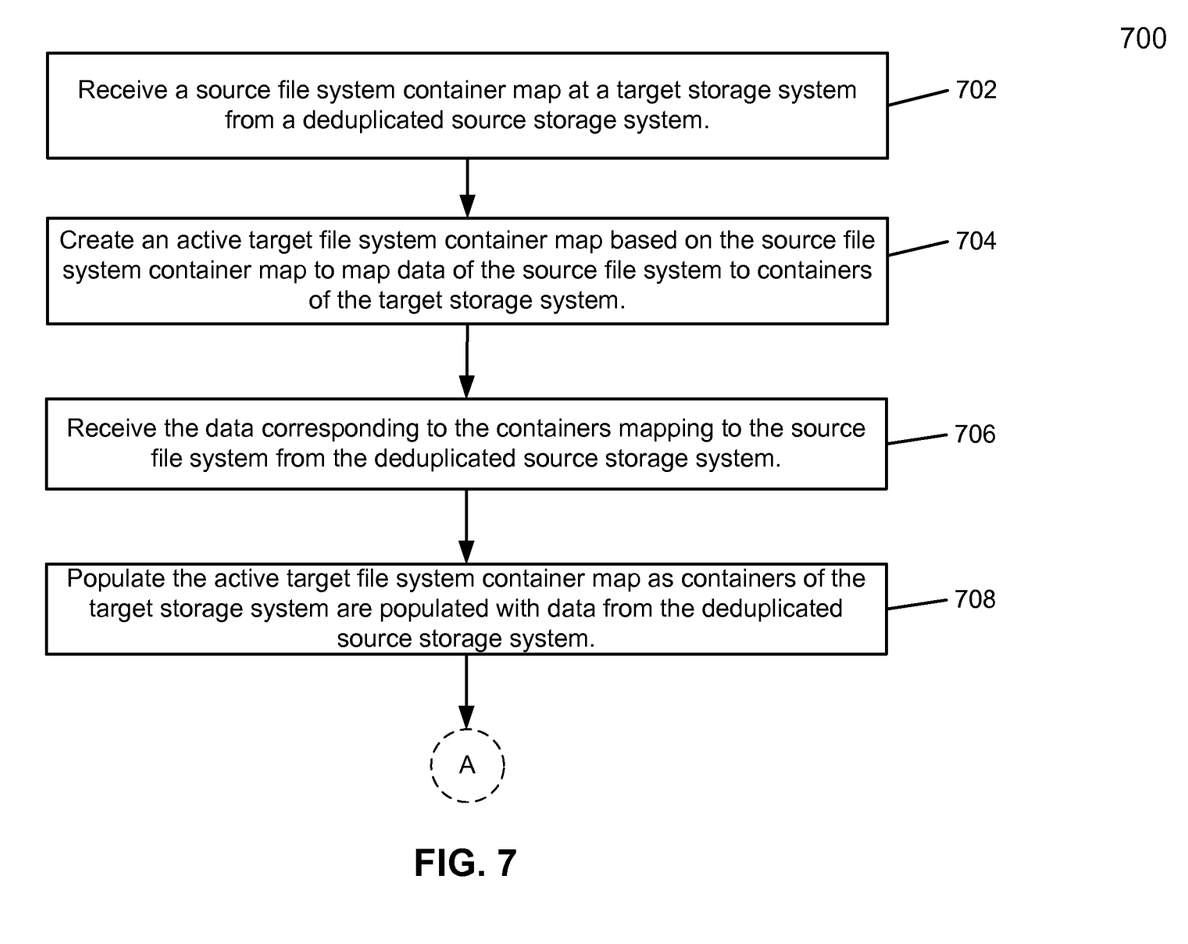
FIG. 7 is a flow diagram illustrating an initial file system replication process from a deduplicated source storage to a target storage according to one embodiment of the invention.

FIG. 7 is a flow diagram illustrating an initial file system replication process from a deduplicated source storage to a target storage according to one embodiment of the invention. Method 700 may be implemented on a target storage system 110, particularly target replication manager 162 of FIG. 1. As discussed herein, the target storage system 110 is a deduplicated storage system in one embodiment.

Method 700 starts with receiving a source file system container map at a target storage system from a deduplicated source storage system at reference 702, the source file system container map including mapping between a source file system and containers containing data of the file system. The received source file system container map is generated at the source storage system. It may be a snapshot of an active file system container map of the source storage system in one embodiment. The transmitting the source file system container map may be triggered by a request to initiate one or more files or directories of files associated with the source file system from the source storage system to the target storage system. The source file system container map includes information representing or describing mapping between file systems and containers containing data of the file systems within the source storage system. In one embodiment, the source file system container map indicates a starting point of the file systems (i.e., the anchor containers).

At reference 704, the target storage system creates an active target file system container map based on the source file system container map to map data of the source file system to containers of the target storage system storing the data of the source file system. Similar to the received source file system container map, the target file system container map includes information representing or describing mapping between file systems and containers containing data of the file systems within the target storage system. In one embodiment, the source file system container map indicates a starting point of the file systems (i.e., the anchor containers).

At reference 706, the target storage system receives the data corresponding to the containers mapping to the source file system from the deduplicated source storage system. In one embodiment, the received data are from a snapshot volume capturing a consistent state of the containers mapped to the source file system. The transmission of the data may be triggered by a request to the deduplicated source storage system for requesting the data corresponding to the containers mapped to the source file system to be sent to the target storage system after the active target file system container map is created.

At reference 708, the target storage system populates the active target file system container map as containers of the target storage system are populated with data from the deduplicated source storage system, wherein the source and target container maps are utilized in subsequent restoration of data of the source file system.

As discussed herein, data are continuously written to the source storage system, thus data location and data content for the source file system are changing over time too. A synchronization process is needed to keep the data of the source file system consistent between the source and target storage systems. In one embodiment, the synchronization process is a continuation of method 700 as indicated by the label A following reference 708, and label A is the starting process 800 of FIG. 8.

Figure 8:
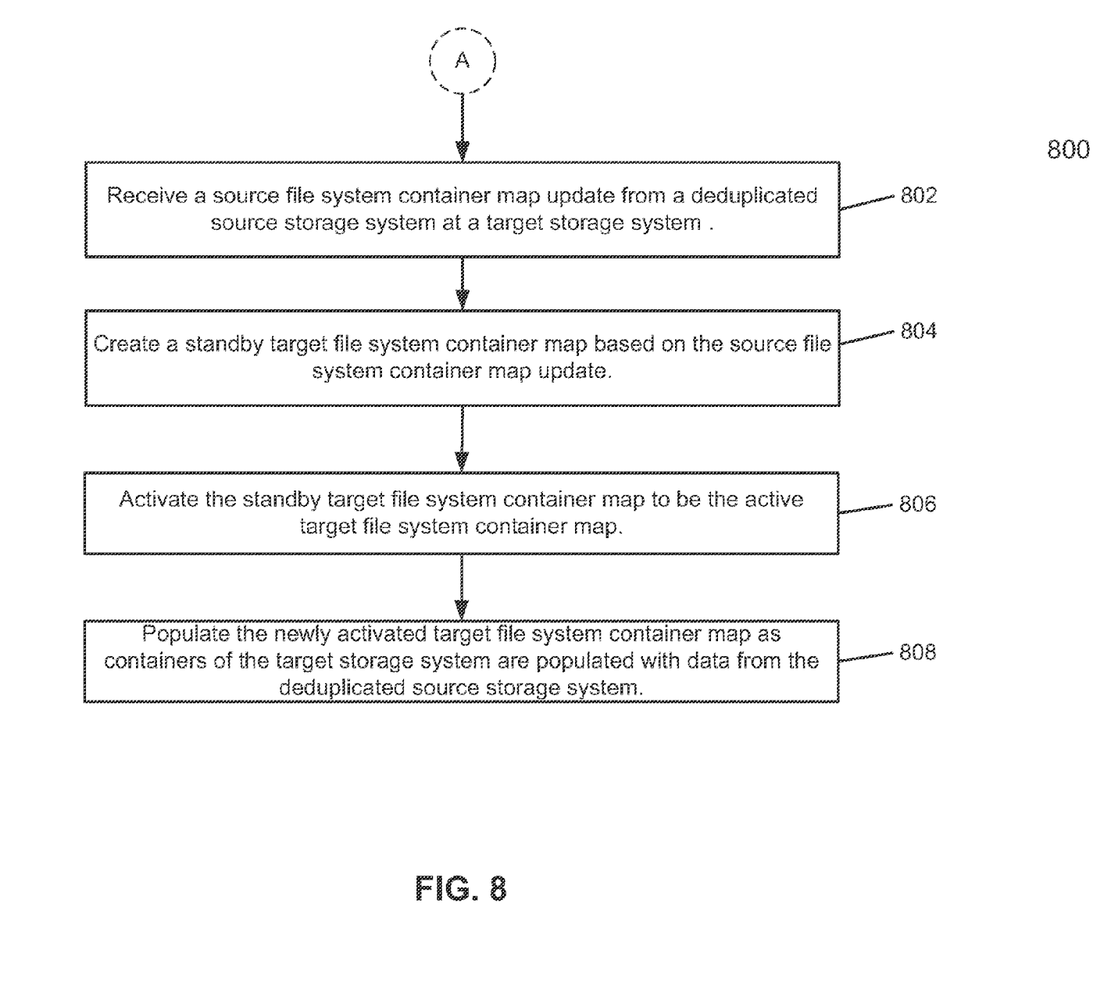
FIG. 8 is a flow diagram illustrating a file system replication update process from a deduplicated source storage to a target storage according to one embodiment of the invention.

FIG. 8 is a flow diagram illustrating a file system replication update process from a deduplicated source storage to a target storage according to one embodiment of the invention. At reference 802, the target storage system receives a source file system container map update from the deduplicated source storage system at the target storage system. The source file system container map update is generated at the source storage and it is determined by capturing another snapshot of the active file system container map and comparing it to the last sent source file system container map in one embodiment.

At reference 804, the target storage creates a standby target file system container map based on the source file system container map update and container characteristics of the target storage system.

At reference 806, the target storage activates the standby target file system container map to be the active target file system container map. The activation is performed during an expose period, which is a time period dedicated to the switching. Then at reference 808, the target storage populates the newly activated target file system container map as containers of the target storage system are populated with data from the deduplicated source storage system.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as those set forth in the claims below, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Embodiments of the invention also relate to an apparatus for performing the operations herein. Such a computer program is stored in a non-transitory computer readable medium. A machine-readable medium includes any mechanism for storing information in a form readable by a machine (e.g., a computer). For example, a machine-readable (e.g., computer-readable) medium includes a machine (e.g., a computer) readable storage medium (e.g., read only memory ("ROM"), random access memory ("RAM"), magnetic disk storage media, optical storage media, flash memory devices).

The processes or methods depicted in the preceding figures may be performed by processing logic that comprises hardware (e.g. circuitry, dedicated logic, etc.), software (e.g., embodied on a non-transitory computer readable medium), or a combination of both. Although the processes or methods are described above in terms of some sequential operations, it should be appreciated that some of the operations described may be performed in a different order. Moreover, some operations may be performed in parallel rather than sequentially.

Embodiments of the present invention are not described with reference to any particular programming language. It will be appreciated that a variety of programming languages may be used to implement the teachings of embodiments of the invention as described herein.

In the foregoing specification, embodiments of the invention have been described with reference to specific exemplary embodiments thereof. It will be evident that various modifications may be made thereto without departing from the broader spirit and scope of the invention as set forth in the following claims. The specification and drawings are, accordingly, to be regarded in an illustrative sense rather than a restrictive sense.

What is claimed is:

1. A computer-implemented method, comprising:
receiving a source file system container map at a target storage system from a deduplicated source storage system, the source file system container map including a plurality of entries, each entry mapping a file system identifier (ID) identifying a source file system and a plurality of source container IDs identifying containers containing data of the source file system stored at the deduplicated source storage system, wherein the source container IDs include an anchor container that identifies a starting point of a container ID string of the data of the source file system, wherein each of the containers contains a plurality of compression regions and each compression region contains a plurality of deduplicated data chunks, wherein the source file system is one of a plurality of file systems installed at the source storage system, wherein each of the plurality of file systems has its own file system namespace including a directory hierarchy and folders, and wherein the plurality of file systems share an identical storage volume of the source storage system;
creating an active target file system container map based on the source file system container map to map the data of the source file system to containers of the target storage system storing the data of the source file system;
receiving, at the target storage system from the deduplicated source storage system, the data corresponding to the containers identified in the source file system container map;
storing the data in a plurality of target containers at the target storage system, wherein the plurality of target containers are identified by a plurality of target container IDs respectively; and populating the active target file system container map to map the file system ID to the target container IDs that identify the target containers, wherein the source and target file system container maps are utilized in subsequent restoration of data of the source file system based on the file system ID stored in the source and target file system container maps.

2. The computer-implemented method of claim 1, wherein the received data corresponding to the containers mapped to the source file system are from a snapshot volume capturing a consistent state of the containers mapped to the source file system.

3. The computer-implemented method of claim 1, wherein the received source file system container map is a snapshot of an active file system container map of the source storage system, and wherein the snapshot represents a consistent state of the active file system container map.

4. The computer-implement method of claim 1, further comprising:
receiving a source file system container map update from the deduplicated source storage system at the target storage system;
creating a standby target file system container map based on the source file system container map update and container characteristics of the target storage system;
activating the standby target file system container map to be the active target file system container map; and
populating the newly activated target file system container map as containers of the target storage system are populated with data from the deduplicated source storage system.

5. The computer-implemented method of claim 1, further comprising:
transmitting a request to the deduplicated source storage system for requesting the data corresponding to the containers mapped to the source file system to be sent to the target storage system after creating the active target file system container map.

6. The computer-implemented method of claim 1, wherein the target storage system is a deduplicated storage system.

7. A target storage system, comprising:
a processor;
a memory coupled to the processor; and
a replication manager configured to
receive a source file system container map from a deduplicated source storage system, the source file system container map including a plurality of entries, each entry mapping a file system identifier (ID) identifying a source file system and a plurality of source container IDs identifying containers containing data of the source file system stored at the deduplicated source storage system, wherein the source container IDs include an anchor container that identifies a starting point of a container ID string of the data of the source file system, wherein each of the containers contains a plurality of compression regions and each compression region contains a plurality of deduplicated data chunks, wherein the source file system is one of a plurality of file systems installed at the source storage system, wherein each of the plurality of file systems has its own file system namespace including a directory hierarchy and folders, and wherein the plurality of file systems share an identical storage volume of the source storage system;
create an active target file system container map based on the source file system container map to map the data of the source file system to containers of the target storage system storing the data of the source file system;
receive, at the target storage system from the deduplicated source storage system, the data corresponding to the containers identified in the source file system container map;
store the data in a plurality of target containers at the target storage system, wherein the plurality of target containers are identified by a plurality of target container IDs respectively; and
populate the active target file system container map to map the file system ID to the target container IDs that identify the target containers, wherein the source and target file system container maps are utilized in subsequent restoration of data of the source file system based on the file system ID stored in the source and target file system container maps.

8. The target storage system of claim 7, wherein the received data corresponding to the containers mapped to the source file system are from a snapshot volume capturing a consistent state of the containers mapped to the source file system.

9. The target storage system of claim 7, wherein the received source file system container map is a snapshot of an active file system container map of the source storage system, and wherein the snapshot represents a consistent state of the active file system container map.

10. The target storage system of claim 7, wherein the replication manager is further configured to:
receive a source file system container map update from the deduplicated source storage system at the target storage system;
create a standby target file system container map based on the source file system container map update and container characteristics of the target storage system;
activate the standby target file system container map to be the active target file system container map; and
populate the newly activated target file system container map as containers of the target storage system are populated with data from the deduplicated source storage system.

11. The target storage system of claim 7, wherein the replication manager is further configured to:
transmit a request to the deduplicated source storage system for requesting the data corresponding to the containers mapped to the source file system to be sent to the target storage system after creating the active target file system container map.

12. The target storage system of claim 7, where the target storage system is a deduplicated storage system.

13. A non-transitory computer-readable medium having instructions stored therein, which when executed by a processor, cause the processor to perform operations, the operations comprising:
receiving a source file system container map at a target storage system from a deduplicated source storage system, the source file system container map including a plurality of entries, each entry mapping a file system identifier (ID) identifying a source file system and a plurality of source container IDs identifying containers containing data of the source file system stored at the deduplicated source storage system, wherein the source container IDs include an anchor container that identifies a starting point of a container ID string of the data of the source file system, wherein each of the containers contains a plurality of compression regions and each compression region contains a plurality of deduplicated data chunks, wherein the source file system is one of a plurality of file systems installed at the source storage system, wherein each of the plurality of file systems has its own file system namespace including a directory hierarchy and folders, and wherein the plurality of file systems share an identical storage volume of the source storage system;

creating an active target file system container map based on the source file system container map to map the data of the source file system to containers of the target storage system storing the data of the source file system;

receiving, at the target storage system from the deduplicated source storage system, the data corresponding to the containers identified in the source file system container map;

storing the data in a plurality of target containers at the target storage system, wherein the plurality of target containers are identified by a plurality of target container IDs respectively; and populating the active target file system container map to map the file system ID to the target container IDs that identify the target containers, wherein the source and target file system container maps are utilized in subsequent restoration of data of the source file system based on the file system ID stored in the source and target file system container maps.

14. The non-transitory computer-readable medium of claim 13, wherein the received data corresponding to the containers mapped to the source file system are from a snapshot volume capturing a consistent state of the containers mapped to the source file system.

15. The non-transitory computer-readable medium of claim 13, wherein the received source file system container map is a snapshot of an active file system container map of the source storage system, and wherein the snapshot represents a consistent state of the active file system container map.

16. The non-transitory computer-readable medium of claim 13, wherein the operations further comprise:
receiving a source file system container map update from the deduplicated source storage system at the target storage system;
creating a standby target file system container map based on the source file system container map update and container characteristics of the target storage system;
activating the standby target file system container map to be the active target file system container map; and
populating the newly activated target file system container map as containers of the target storage system are populated with data from the deduplicated source storage system.

17. The non-transitory computer-readable medium of claim 13, wherein the operations further comprise:
transmitting a request to the deduplicated source storage system for requesting the data corresponding to the containers mapped to the source file system to be sent to the target storage system after creating the active target file system container map.

* * * * *